(12) United States Patent
Zhao et al.

(10) Patent No.: US 12,474,832 B2
(45) Date of Patent: Nov. 18, 2025

(54) METHOD AND APPARATUS FOR SEPARATING SENSING AREA DURING HOVERING CONTROL, AND HOVERING CONTROL REMOTE CONTROLLER

(71) Applicant: Huawei Technologies Co., Ltd., Shenzhen (CN)

(72) Inventors: Xuewen Zhao, Xi'an (CN); Jian Shen, Hangzhou (CN); Xiaorui Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 18/564,888

(22) PCT Filed: May 7, 2022

(86) PCT No.: PCT/CN2022/091500
§ 371 (c)(1),
(2) Date: Nov. 28, 2023

(87) PCT Pub. No.: WO2022/247616
PCT Pub. Date: Dec. 1, 2022

(65) Prior Publication Data
US 2024/0272790 A1    Aug. 15, 2024

(30) Foreign Application Priority Data

May 28, 2021  (CN) .......................... 202110593296.2

(51) Int. Cl.
*G09G 5/00*   (2006.01)
*G06F 3/041*  (2006.01)
(Continued)

(52) U.S. Cl.
CPC ........ *G06F 3/04886* (2013.01); *G06F 3/0416* (2013.01); *G06F 3/04883* (2013.01);
(Continued)

(58) Field of Classification Search
CPC ........... G06F 3/044; G06F 2203/04104; G06F 3/04886; G06F 3/0416; G06F 3/04883; G06F 2203/04101; G06F 2203/04808
(Continued)

(56) References Cited

U.S. PATENT DOCUMENTS

| 2006/0026521 A1* | 2/2006 | Hotelling .............. G06F 3/0488 715/702 |
| 2009/0174675 A1 | 7/2009 | Gillespie et al. |

(Continued)

FOREIGN PATENT DOCUMENTS

| CN | 101971125 B | 4/2016 |
| CN | 107683452 A | 2/2018 |

*Primary Examiner* — Jennifer T Nguyen
(74) *Attorney, Agent, or Firm* — Conley Rose, P.C.

(57) ABSTRACT

A method includes a computer device that determines a first sensing central point of a second sensing area and a second sensing central point of a third sensing area based on sensing data on a hovering control panel at a reference moment, determines an area segmentation line of a first sensing area based on the first sensing central point and the second sensing central point, and segments, based on the area segmentation line, the first sensing area generated at a first moment to obtain a first sensing control area and a second sensing control area such that, a case in which sensing areas generated by two objects are combined or a weaker sensing area is covered when the two objects are in proximity or overlap can be effectively avoided.

20 Claims, 7 Drawing Sheets

(51) Int. Cl.
*G06F 3/04883* (2022.01)
*G06F 3/04886* (2022.01)

(52) U.S. Cl.
CPC ............. *G06F 2203/04101* (2013.01); *G06F 2203/04104* (2013.01); *G06F 2203/04808* (2013.01)

(58) Field of Classification Search
USPC ......................................................... 345/173
See application file for complete search history.

(56) References Cited

U.S. PATENT DOCUMENTS

| | | | |
|---|---|---|---|
| 2011/0310040 A1 | 12/2011 | Ben-Shalom et al. | |
| 2015/0205404 A1* | 7/2015 | Nam ..................... | G06F 3/0416 345/174 |
| 2018/0129224 A1* | 5/2018 | Hur ..................... | H04N 13/239 |

* cited by examiner

METHOD AND APPARATUS FOR SEPARATING SENSING AREA DURING HOVERING CONTROL, AND HOVERING CONTROL REMOTE CONTROLLER

CROSS-REFERENCE TO RELATED APPLICATIONS

This is a U.S. National Stage of International Patent Application No. PCT/CN2022/091500 filed on May 7, 2022, which claims priority to Chinese Patent Application No. 202110593296.2 filed on May 28, 2021. Both of the aforementioned applications are hereby incorporated by reference in their entireties.

TECHNICAL FIELD

This application relates to the field of hovering touch, and in particular, to a method and an apparatus for separating a sensing area during hovering control, a hovering control remote controller, and a storage medium.

BACKGROUND

With the development of hovering touch technologies, it is possible to control a large screen by performing a multi-finger operation by holding a peripheral of a control panel. An operation of controlling the entire large screen can be implemented only by touching or performing hovering control on a control panel whose size is similar to that of a mobile phone. A hovering cursor is different from a touch cursor in that hand-eye separation can be implemented, and a person only needs to look at the large screen to perform accurate control. The multi-finger operation enables complex game and track application operations to be implemented on the large screen, and this greatly improves operability and visual experience, and operation habits for the mobile phone can be seamlessly migrated to the large screen.

During a hovering touch operation, a remote controller needs to detect a quantity of fingers and finger information and report the quantity of fingers and the finger information to the large screen. The remote controller obtains a signal change case from the control panel to detect the finger information, including the quantity of fingers, positions, touch and hovering states of fingers, and the like. Different heights from a fingertip to the control panel lead to different sizes of sensing areas caused on the control panel. In the case of a single finger or when two fingers are far away from each other on a horizontal plane, sensing areas of the fingers can be clearly separated, and are easy to detect, track, and distinguish. However, when two fingers are very close on the horizontal plane, especially when one finger is far away from a hovering control panel and the other finger is close to the hovering control panel on a vertical plane, a sensing area generated by the closer finger on the hovering control panel is stronger, and a sensing area generated by the farther finger is weaker. In this case, the sensing areas of the two fingers are combined or the weaker sensing area is covered, and a result of recognizing the quantity of fingers and the finger information by using the sensing area is unreliable, the finger that is far away from the hovering control panel cannot be identified, finger information is lost, and correct feedback of a user operation cannot be obtained, thereby greatly affecting control accuracy and user experience.

SUMMARY

This application provides a method and an apparatus for separating a sensing area during hovering control, a hovering control remote controller, a computer device, and a storage medium, so that control accuracy and user experience can be improved, and applicability is high.

According to a first aspect, this application provides a method for separating a sensing area during hovering control. In the method, a computer device may use, as two reference segmentation central points of a first sensing area generated at a first moment, sensing central points of two sensing areas generated at a reference moment (that is, a sampling moment that is closest to the first moment and at which two objects can be separated), determine an area segmentation line of the first sensing area based on the two reference segmentation central points, and segment the first sensing area based on the area segmentation line to obtain a first sensing control area and a second sensing control area. A sensing area generated when two objects (for example, fingers or sensing pens) are close together or overlap can be segmented, so that a case in which sensing areas of two objects are combined or a weaker sensing area is covered when the two objects are close together or overlap can be effectively avoided, thereby improving control accuracy and user experience, and having high applicability.

With reference to the first aspect, in a first possible implementation, the computer device respectively determines a point with a maximum sensing value in a second sensing area and a point with a maximum sensing value in a third sensing area as a first sensing central point and a second sensing central point. A larger sensing value of a point on a hovering control panel indicates a closer distance from the point to an object for hovering control. Therefore, when a point with a maximum sensing value in a sensing area is determined as a sensing central point, segmentation accuracy of the sensing area can be improved.

With reference to the first aspect, in a second possible implementation, a target area that is in the first sensing area and that is perpendicular to a connection line between the first sensing central point and the second sensing central point is determined based on the connection line, an area segmentation point of the first sensing area is determined based on the target area, and the area segmentation line is obtained based on the area segmentation point. Because the first sensing central point and the second sensing central point are sensing central points of two sending areas generated at a sampling moment (that is, a reference moment) that is closest to the first moment and at which two objects can be separated, when the first sensing area is segmented based on prior information (that is, the two sensing central points at the reference moment), segmentation accuracy of the sensing area can be improved.

With reference to the first aspect, in a third possible implementation, the computer device may divide, based on a direction in which the connection line is located and a preset interval value, the target area into a plurality of row areas that are consistent with the direction in which the connection line is located, and determine a point with a minimum sensing value in each row area as the area segmentation point of the first sensing area. For example, when two fingers are close together, a height from a location at which the two fingers come into contact to the hovering control panel is a highest height in heights from an area in which central points (that is, the first sensing central point and the second sensing central point) of the two fingers to the hovering control panel. Therefore, when the point with the minimum sensing value in each row area in the target area is determined as the area segmentation point, segmentation accuracy of the sensing area can be improved.

With reference to the first aspect, in a fourth possible implementation, the computer device determines a first area sensing characteristic value of the first sensing control area and a second area sensing characteristic value of the second sensing control area, and when a difference between the first area sensing characteristic value and the second area sensing characteristic value is greater than a preset difference threshold, determines a first target sensing control area based on a first start point and a sensing value table of the hovering control panel at the first moment, and determines a second target sensing control area based on a second start point and the sensing value table of the hovering control panel at the first moment, where the first start point is a point with a maximum sensing value in the first sensing control area, and the second start point is a point with a maximum sensing value in the second sensing control area. It can be understood that, after the first sensing control area and the second sensing control area are obtained, whether the difference between the first area sensing characteristic value and the second area sensing characteristic value is greater than the preset difference threshold can be determined through comparison to determine whether the obtained first sensing control area and the obtained second sensing control area have information loss, that is, whether segmentation of the first sensing area is correct. When the difference is greater than the preset difference threshold, the first sensing control area and the second sensing control area are completed, to obtain a more complete first target sensing control area and a more complete second target sensing control area. Therefore, segmentation accuracy of the sensing area can be further improved, control accuracy and user experience can be further improved, and applicability is higher.

With reference to the first aspect, in a fifth possible implementation, the computer device determines, as a first target point, a point that is in a plurality of points adjacent to the first start point and whose sensing value is less than a sensing value of the first start point, and adds the first start point and the first target point to a first target point set; determines whether a point whose sensing value is less than a sensing value of the first target point exists in the plurality of points adjacent to the first target point, and if the point exists, determines the point whose sensing value is less than the sensing value of the first target point as the first target point, and adds the first target point to the first target point set; and determines the first target sensing control area based on the first target point set. It can be understood that, the computer device performs secondary area searching on an area of the hovering control panel by using a gradient descent area search method, to complete the first sensing control area to obtain a complete first target sensing control area, so that segmentation accuracy of the sensing area can be further improved.

With reference to the first aspect, in a sixth possible implementation, the computer device determines an average value of sensing values of all points in the first sensing control area as the first area sensing characteristic value, and determines an average value of sensing values of all points in the second sensing control area as the second area sensing characteristic value.

With reference to the first aspect, in a seventh possible implementation, before obtaining hovering sensing area data generated by a hovering operation performed by a user above the hovering control panel in a first time period, the computer device obtains initial hovering control panel sensing data generated by the hovering operation performed by the user above the hovering control panel in the first time period, where the initial hovering control panel sensing data includes a plurality of sampling moments in the first time period and a sensing value table of the hovering control panel at each sampling moment, and the sensing value table includes a sensing value of each point on the hovering control panel. Then, the computer device determines, as a target point, a point that is in the sensing value table and whose sensing value is greater than a preset sensing threshold, and determines sensing data (that is, a sensing area) on the hovering control panel at each sampling moment based on the target point. It can be understood that, after obtaining a sensing value table at each sampling moment, the computer device can first use an area-connected search method to determine an initial sensing area generated by the hovering operation of the user, and then complete holes of an initial sensing area at each sampling moment to obtain a relatively complete usable area, that is, the sensing area, so that a success rate of subsequent sensing area separation can be improved.

With reference to the first aspect, in an eighth possible implementation, the sensing value includes a capacitance value.

According to a second aspect, this application provides an apparatus for separating a sensing area during hovering control, and the apparatus for separating a sensing area includes:
 a first obtaining unit, configured to obtain hovering sensing area data generated by a hovering operation performed by a user above a hovering control panel in a first time period, where the hovering sensing data includes a plurality of sampling moments in the first time period and sensing data on the hovering control panel at each sampling moment, the plurality of sampling moments include a first moment and a reference moment, sensing data on the hovering control panel at the first moment includes only a first sensing area, sensing data at the reference moment includes a second sensing area and a third sensing area, and the reference moment is a sampling moment that is closest to the first moment and that is in at least one moment corresponding to the two sensing areas included in the sensing data;
 a first determining unit, configured to determine a first sensing central point of the second sensing area and a second sensing central point of the third sensing area;
 a second determining unit, configured to determine an area segmentation line of the first sensing area based on the first sensing central point and the second sensing central point; and
 a segmentation unit, configured to segment the first sensing area based on the area segmentation line to obtain a first sensing control area and a second sensing control area.

With reference to the second aspect, in a first possible implementation, the first determining unit is configured to respectively determine a point with a maximum sensing value in the second sensing area and a point with a maximum sensing value in the third sensing area as the first sensing central point and the second sensing central point.

With reference to the second aspect, in a second possible implementation, the second determining unit is configured to: determine, based on a connection line between the first sensing center and the second sensing center, a target area that is in the first sensing area and that is perpendicular to the connection line; and determine an area segmentation point of the first sensing area based on the target area, and obtain the area segmentation line based on the area segmentation point.

With reference to the second aspect, in a third possible implementation, the second determining unit is configured to: divide, based on a direction in which the connection line is located and a preset interval value, the target area into a plurality of row areas that are consistent with the direction in which the connection line is located; and determine a point with a minimum sensing value in each row area as the area segmentation point of the first sensing area.

With reference to the second aspect, in a fourth possible implementation, the apparatus further includes:
- a third determining unit, configured to determine a first area sensing characteristic value of the first sensing control area and a second area sensing characteristic value of the second sensing control area; and
- a fourth determining unit, configured to: when a difference between the first area sensing characteristic value and the second area sensing characteristic value is greater than a preset difference threshold, determine a first target sensing control area based on a first start point and a sensing value table of the hovering control panel at the first moment, and determine a second target sensing control area based on a second start point and the sensing value table of the hovering control panel at the first moment, where the first start point is a point with a maximum sensing value in the first sensing control area, and the second start point is a point with a maximum sensing value in the second sensing control area.

With reference to the second aspect, in a fifth possible implementation, the sensing value table includes a sensing value of each point on the hovering control panel; and
the fourth determining unit is configured to: determine, as a first target point, a point that is in a plurality of points adjacent to the first start point and whose sensing value is less than a sensing value of the first start point, and add the first start point and the first target point to a first target point set; determine whether a point whose sensing value is less than a sensing value of the first target point exists in the plurality of points adjacent to the first target point, and if the point exists, determine the point whose sensing value is less than the sensing value of the first target point as the first target point, and add the first target point to the first target point set; and determine the first target sensing control area based on the first target point set.

With reference to the second aspect, in a sixth possible implementation, the third determining unit is configured to: determine an average value of sensing values of all points in the first sensing control area as the first area sensing characteristic value, and determine an average value of sensing values of all points in the second sensing control area as the second area sensing characteristic value.

With reference to the second aspect, in a seventh possible implementation, the apparatus further includes:
- a second obtaining unit, configured to obtain initial hovering control panel sensing data generated by the hovering operation performed by the user above the hovering control panel in the first time period, where the initial hovering control panel sensing data includes a plurality of sampling moments in the first time period and a sensing value table of the hovering control panel at each sampling moment, and the sensing value table includes a sensing value of each point on the hovering control panel; and
- a fifth determining unit, configured to: determine, as a target point, a point that is in the sensing value table and whose sensing value is greater than a preset sensing threshold, and determine sensing data on the hovering control panel at each sampling moment based on the target point.

With reference to the second aspect, in an eighth possible implementation, the sensing value includes a capacitance value.

According to a third aspect, this application provides a hovering control remote controller. The hovering control remote controller includes the apparatus for separating a sensing area according to any one of the first possible implementation to the eighth possible implementation of the second aspect and a hovering control panel.

According to a fourth aspect, this application provides a computer device. The computer device includes a processor, a memory, and an input device. The processor, the memory, and the input device are connected to each other. The memory is configured to store a computer program, the computer program includes program instructions, and the processor is configured to invoke the program instructions and the input device to perform the method for separating a sensing area according to the first aspect.

According to a fifth aspect, an embodiment of this application provides a computer-readable storage medium. The computer-readable storage medium stores instructions, and the instructions may be executed by one or more processors of a processing circuit. When the instructions are run on a computer, the computer is enabled to perform the method for separating a sensing area according to the first aspect.

According to a sixth aspect, an embodiment of this application provides a computer program product including instructions. When the computer program product is run on a computer, the computer is enabled to perform the method for separating a sensing area according to the first aspect.

It should be understood that implementations and beneficial effects of the foregoing aspects of this application may be referred to each other.

DESCRIPTION OF EMBODIMENTS

Figure 1:
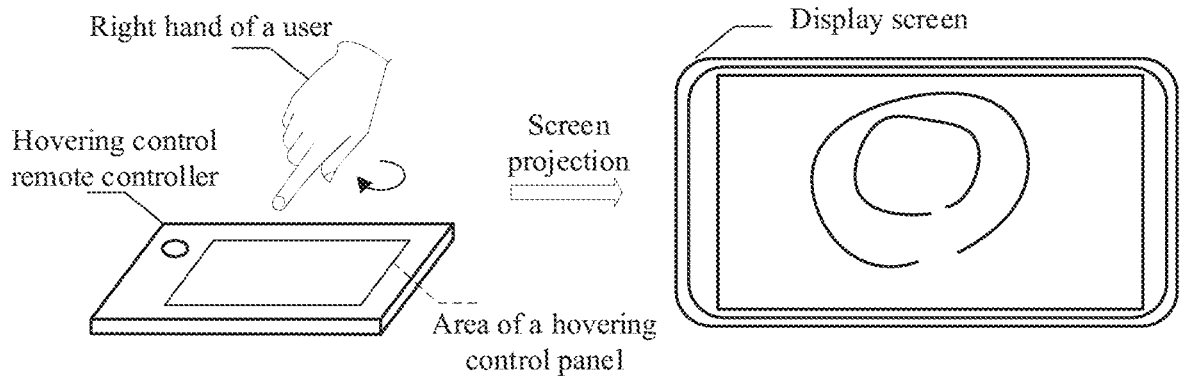
FIG. 1 is a schematic diagram of an application scenario of a method for separating a sensing area according to this application.

A method provided in this application is applicable to the field of sensing area separation in the field of hovering touch. A computer device in this application may be an entity terminal with a sensing area separation function. The entity terminal may be a server, or may be a user terminal. This is not limited herein. The server may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (content delivery network, CDN), big data, and an artificial intelligence platform. The user terminal may include but is not limited to a tablet device, a desktop computer, a notebook computer, a mobile phone, or any other terminal device that can complete information exchange.

In a method for separating a sensing area during hovering control provided in this application, a computer device may obtain hovering sensing area data generated by a hovering operation performed by a user above a hovering control panel in a first time period, where the hovering sensing data includes a plurality of sampling moments in the first time period and sensing data on the hovering control panel at each sampling moment, the plurality of sampling moments include a first moment and a reference moment, sensing data on the hovering control panel at the first moment includes only a first sensing area (for example, a sensing area generated when two fingers are close together or overlap), sensing data at the reference moment includes a second sensing area and a third sensing area, and the reference moment is a moment that is closest to the first moment and that is in at least one moment corresponding to the two sensing areas included in the sensing data. Then, the computer device determines a first sensing central point of the second sensing area and a second sensing central point of the third sensing area, and determines an area segmentation line of the first sensing area based on the first sensing central point and the second sensing central point. Further, the computer device may segment the first sensing area based on the area segmentation line to obtain a first sensing control area and a second sensing control area. In this application, a sensing area generated when two objects (for example, fingers or sensing pens) are close together or overlap can be segmented, so that a case in which response areas of the two objects are combined or a weaker response area is covered when the two objects are close together or overlap can be effectively avoided, thereby improving control accuracy and user experience, and having high applicability. The method for separating a sensing area provided in this application may be applicable to different sensing area separation application scenarios. For example, the method has a wide range of application scenarios in many scenarios involving hovering control, such as a hovering control game and hovering control drawing. An application scenario of hovering control drawing is used as an example below for description, and details are not described below.

In an application scenario of hovering control drawing, a computer device in this application may be a hovering control remote controller. FIG. 1 is a schematic diagram of an application scenario of a method for separating a sensing area according to this application. As shown in FIG. 1, the computer device may establish communication with a display screen. When a user performs hovering control drawing, a thumb and an index finger of a right hand of the user perform a hovering operation (for example, rotation) above an area of a hovering control panel. In this case, a hovering control remote controller obtains initial hovering control panel sensing data generated by the right hand of the user in a hovering operation process. The initial hovering panel sensing data includes a plurality of sampling moments in a first time period (that is, a time period in which the right hand of the user is above the area of the hovering control panel) and a sensing value table of the hovering control panel at each sampling moment. The hovering control remote controller determines sensing data (that is, a sensing area) of the hovering control panel at each sampling moment based on the sensing value table of the hovering control panel at each sampling moment in the first time period. The plurality of sampling moments include a first moment and a reference moment, sensing data on the hovering control panel at the first moment includes only a first sensing area, sensing data at the reference moment includes a second sensing area and a third sensing area, and the reference moment is a sampling moment that is closest to the first moment and that is in at least one sampling moment corresponding to the two sensing areas included in the sensing data. Then, the computer device determines a first sensing central point of the second sensing area and a second sensing central point of the third sensing area, and determines an area segmentation line of the first sensing area based on the first sensing central point and the second sensing central point, and then segments the first sensing area based on the area segmentation line to obtain a first sensing control area and a second sensing control area. In the entire process, the computer device can automatically segment a sensing area generated when two fingers are close together or overlap, so that a problem that it is difficult to segment a sensing area generated when two fingers are close together is effectively avoided, control accuracy and user experience are improved, and applicability is high.

Figure 2:
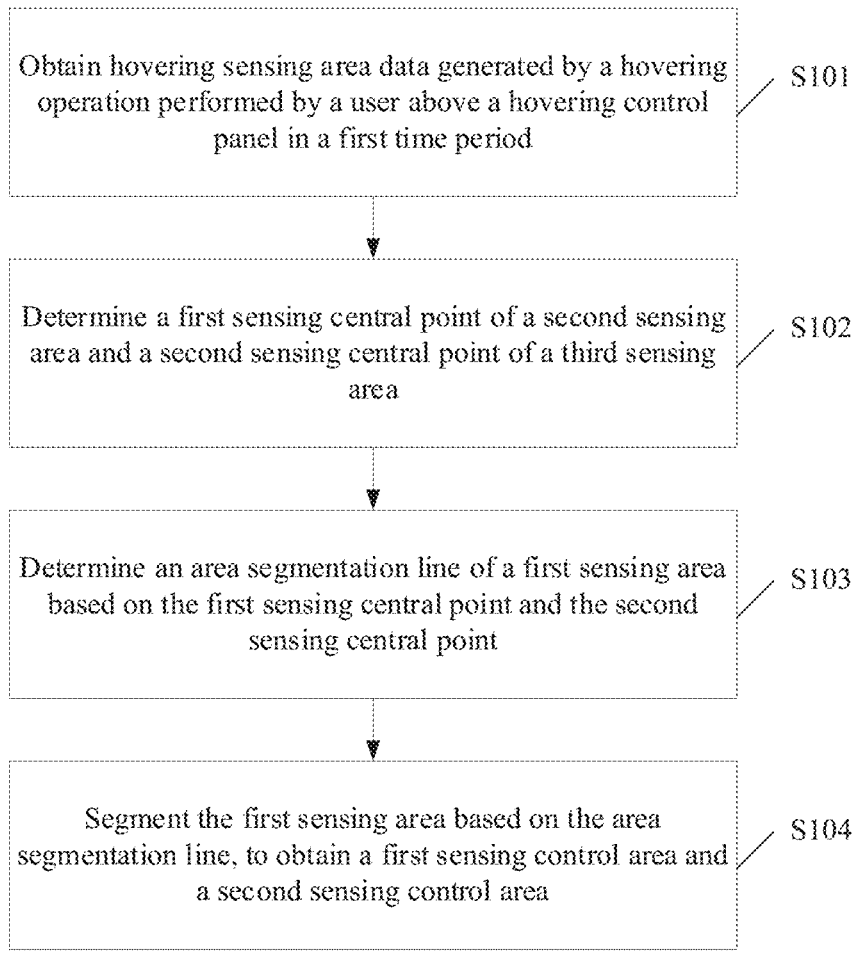
FIG. 2 is a schematic flowchart of a method for separating a sensing area according to this application.

An example of a method for separating a sensing area during hovering control according to this application is described below with reference to FIG. 2 to FIG. 7. FIG. 2 is a schematic flowchart of a method for separating a sensing area according to this application. As shown in FIG. 2, the method includes the following step S101 to step S104.

Step S101: Obtain hovering sensing area data generated by a hovering operation performed by a user above a hovering control panel in a first time period.

In some feasible implementations, before performing step S101, a computer device obtains initial hovering control panel sensing data generated by the hovering operation performed by the user above the hovering control panel in the first time period. The initial hovering control panel sensing data includes a plurality of sampling moments in the first time period and a sensing value table of the hovering control panel at each sampling moment, and the sensing value table includes a sensing value of each point on the hovering control panel and a coordinate value of each point. It should be noted that, a value of the sensing value of each point may reflect a distance between an object such as a finger or a sensing pen that can change a sensing value on the hovering control panel and the hovering control panel in a process of performing hovering control above the hovering control panel by the user. For example, a larger sensing value of a point A on the hovering control panel indicates a closer distance between the finger and the point A.

Herein, the first time period may be a time period corresponding to the hovering operation performed by the user above the hovering control panel. The hovering operation performed by the user above the hovering control panel may be corresponding continuous operations of two fingers of the user from a separated state to a state in which the two fingers are close together and then to a state in which the two fingers overlap in a direction perpendicular to the hovering control panel, or corresponding continuous operations of the user of controlling two sensing pens from overlapping in a direction perpendicular to the hovering control panel to a state in which the two sensing pens are close together and then to a state in which the two sensing pens are in a separated state. The sensing pen may be any object that can change a sensing value of a point on the hovering control panel when the sensing pen is above the hovering control panel.

Then, the computer device traverses each point in the sensing value table of the hovering control panel at each sampling moment, determines a point whose sensing value is greater than a preset sensing threshold as a target point, and forms an initial sensing area at each sampling moment based on the target point. In this way, a hole completing method (for example, a morphological closure operation, that is, corrosion after expansion) may be used to complete a hole in the initial sensing area at each sampling moment, to obtain sensing data on the hovering control panel at each sampling moment, that is, a sensing area.

It can be understood that, after obtaining the sensing value table at each sampling moment, the computer device first determines, by using an area search method (for example, the foregoing area-connected search method), an initial sensing area generated due to the hovering operation of the user, and then performs hole completing on the initial sensing area at each sampling moment, to obtain a relatively complete available area, that is, the sensing area, so that a success rate of subsequent sensing area separation can be improved.

Figure 3:
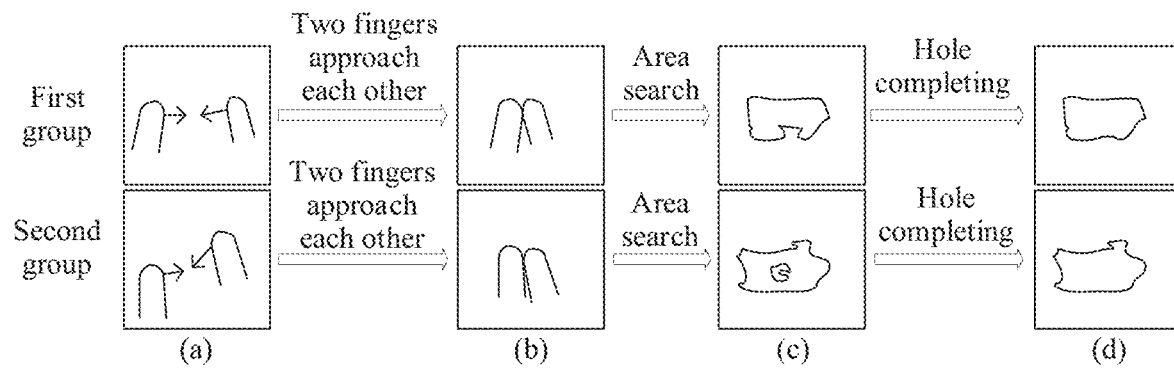
FIG. 3 is a schematic diagram of a working procedure of determining a sensing area on a hovering control panel at a first moment according to this application.

For example, an example in which the hovering operation performed by the user above the hovering control panel is that two fingers of the user change from a separated state to an adjacent state is used to describe obtaining of the sensing area on the hovering control panel at the first moment. FIG. 3 is a schematic diagram of a working procedure of determining the sensing area on the hovering control panel at the first moment according to this application. As shown in FIG. 3, the figure includes a process of determining the sensing area on the hovering control panel at the first moment in a process in which a first group of two fingers approach each other, and a process of determining the sensing area on the hovering control panel at the first moment in a process in which a second group of two fingers approach each other. Rectangular boxes in (a) to (d) in FIG. 3 represent the hovering control panel. The first group is used as an example below for description. (a) in FIG. 3 represents a process in which two fingers approach each other; (b) in FIG. 3 represents that the two fingers are close together; (c) in FIG. 3 represents an initial sensing area (that is, an area diagram in which the two fingers may exist. (c) in FIG. 3) at a first moment (that is, a sampling moment corresponding to (b) in FIG. 3) that is obtained after area searching (that is, a process of determining a target point) is performed on a sensing value table of the hovering control panel at the first moment; and (d) in FIG. 3 is a sensing area on the hovering control panel at the first moment obtained after a hole area in (c) in FIG. 3 is completed. For the second group in FIG. 3, refer to the first group. Details are not described herein again.

In this way, the computer device obtains the hovering sensing area data generated by the hovering operation performed by the user above the hovering control panel in the first time period.

The hovering sensing data includes a plurality of sampling moments in the first time period and sensing data (that is, a sensing area) on the hovering control panel at each sampling moment. The plurality of sampling moments include a first moment and a reference moment. Sensing data on the hovering control panel at the first moment includes only a first sensing area. Sensing data at the reference moment includes a second sensing area and a third sensing area. The reference moment is a sampling moment that is closest to the first moment and that is in at least one sampling moment corresponding to the two sensing areas.

Step S102: Determine a first sensing central point of the second sensing area and a second sensing central point of the third sensing area.

In some feasible implementations, the computer device may determine a point with a maximum sensing value in the second sensing area as the first sensing central point of the second sensing area, and determine a point with a maximum sensing value in the third sensing area as the second sensing central point of the third sensing area. The sensing value may be a capacitance value.

Figure 4:
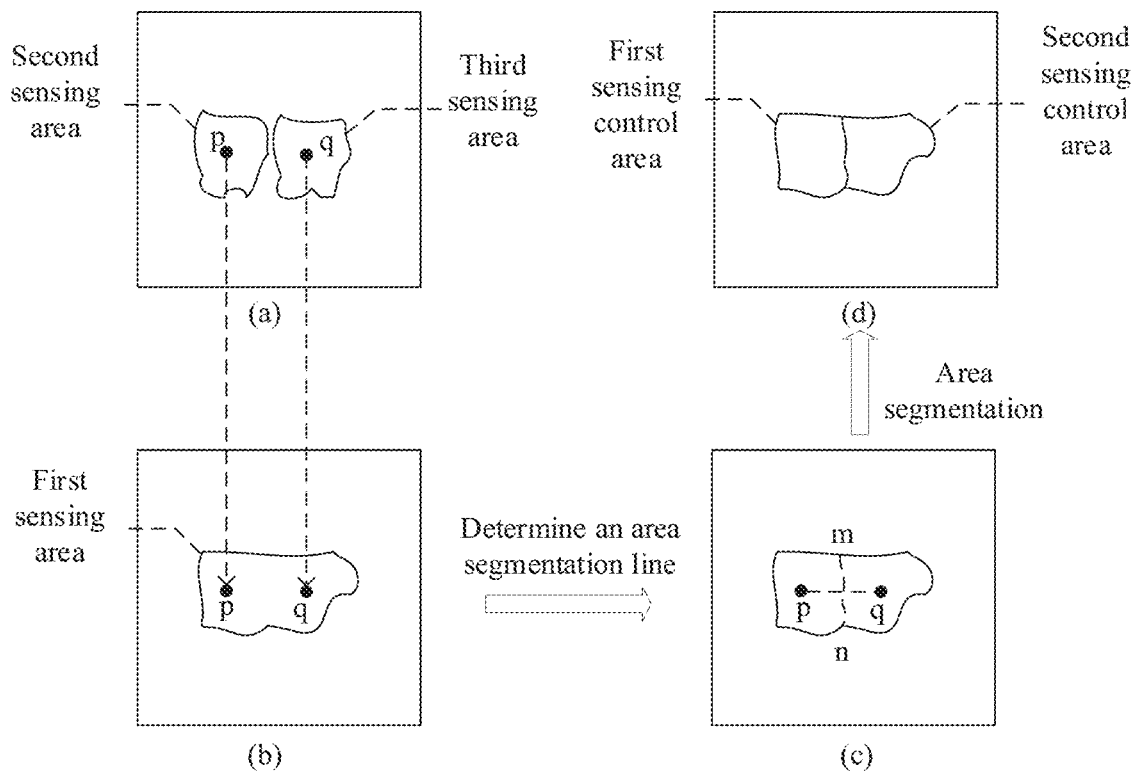
FIG. 4 is a schematic diagram of a working procedure of segmenting a first sensing area according to this application.

For example, for ease of understanding, FIG. 4 is a schematic diagram of a working procedure of segmenting the first sensing area according to this application. As shown in FIG. 4, (a) in FIG. 4 is a sensing area of the hovering control panel at the reference moment, and the sensing area includes the second sensing area and the third sensing area. The computer device obtains a first sensing central point p of the second sensing area and a second sensing central point q of the third sensing area in a manner of determining a sensing central point in step S102. (b) in FIG. 4 is a sensing area of the hovering control panel at the first moment, and the sensing area includes only the first sensing area. After obtaining the first sensing central point p of the second sensing area and the second sensing central point q of the third sensing area, the computer device uses p and q as reference sensing central points of two objects for segmenting the first sensing area.

Step S103: Determine an area segmentation line of the first sensing area based on the first sensing central point and the second sensing central point.

In some feasible implementations, the computer device determines, based on a connection line between the first sensing central point and the second sensing central point, a target area that is in the first sensing area and that is perpendicular to the connection line, divides, based on a direction in which the connection line is located and a preset interval value, the target area into a plurality of row areas that are consistent with the direction in which the connection line is located, determines a point with a minimum sensing value in each row area as an area segmentation point of the first sensing area, and obtains the area segmentation line based on the area segmentation point, that is, a dashed line mn in (c) in FIG. 4.

Figure 5:
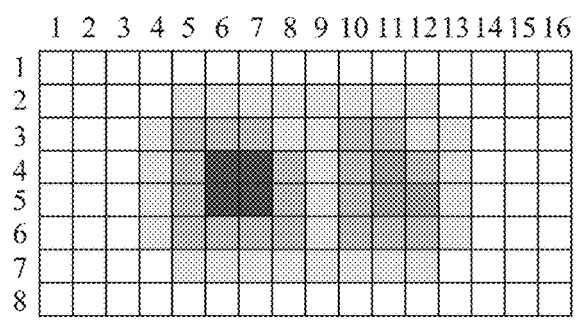
FIG. 5 is a schematic diagram of a working procedure of determining an area segmentation line according to this application.
Figure 5:
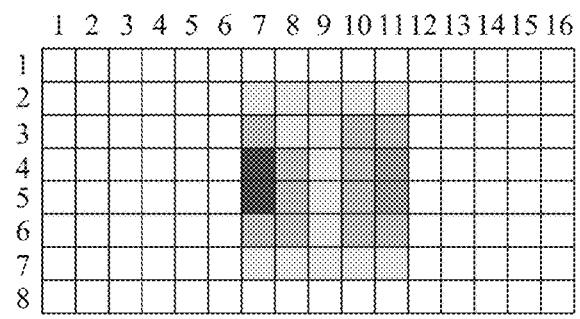
Figure 5:
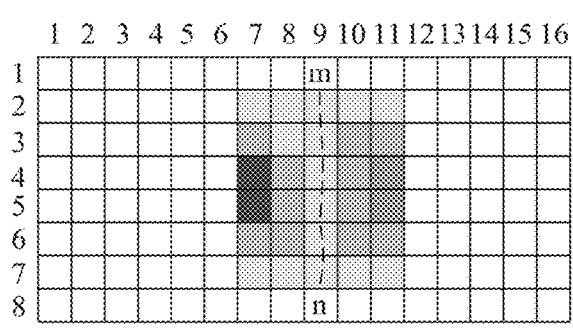
Figure 5:
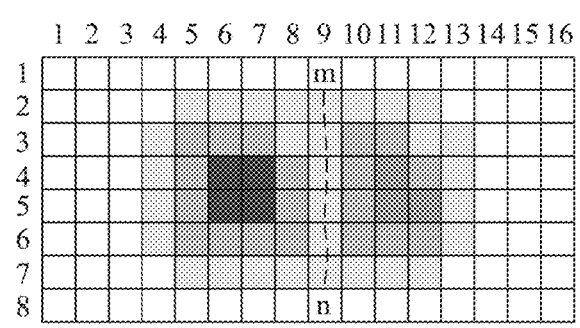

For example, for ease of understanding. FIG. 5 is a schematic diagram of a working procedure of determining the area segmentation line according to this application. As shown in FIG. 5. (1) in FIG. 5 is a detailed sensing area on the hovering control panel at the first moment corresponding to (c) in FIG. 4, that is, a rectangular area including 8*16 small squares. Each small square represents a point in an area of the hovering control panel, and an area including all colored small squares represents the first sensing area generated at the first moment. It is assumed that the first sensing central point p is an intersection point of a fourth row and a seventh column in (1) in FIG. 5, and the second sensing central point q is an intersection point of the fourth row and an eleventh column in (1) in FIG. 5. In this case, a direction in which a connection line between p and q is located is consistent with a direction in which each row in the rectangular area is located, and a first vertical line and a second vertical line that are perpendicular to the direction in which the connection line between p and q is located are respectively drawn from p to q, an area formed by the first vertical line, the second vertical line, and the first sensing area is determined as a target area, that is, an area including all colored small squares in (2) in FIG. 5. Then, the computer device divides the target area into six row areas based on the direction in which the connection line between p and q is located (that is, a direction in which each row in the rectangular area is located) and a preset interval value (that is, a width value of a small square corresponding to each point), that is, a first row area including a seventh column to an eleventh column in a second row, a second row area including a seventh column to an eleventh column in a third row, . . . , and a sixth row area including a seventh column to an eleventh column in a seventh row. In this way, the computer device determines a point with a minimum sensing value in the first row area as a first area segmentation point, determines a point with a minimum sensing value in the second row area as a second area segmentation point, . . . , and determines a point with a minimum sensing value in the sixth row area as a sixth area segmentation point, and connects the foregoing six area segmentation points to obtain a dashed line mn in (3) in FIG. 5, that is, the area segmentation line mn of the first sensing area in (4) in FIG. 5.

Step S104: Segment the first sensing area based on the area segmentation line, to obtain a first sensing control area and a second sensing control area.

For example, refer to FIG. 4 again. A first sensing area on the left of an area segmentation line in (d) in FIG. 4 is the first sensing control area, and a first sensing area on the right of the area segmentation line is the second sensing control area.

It should be noted that, when the sensing area on the hovering control panel at the first moment is a sensing area generated because two fingers of the user are close together, assuming that the second sensing area and the third sensing area are respectively a sensing area generated by a first finger and a sensing area generated by a second finger, after the first sensing area is segmented into two areas, an area including the first sensing central point in the two areas is determined as the first sensing control area (that is, a sensing control area of the first finger), and then, the other area in the two areas is determined as the second sensing control area (that is, a sensing control area of the second finger).

In this embodiment of this application, the computer device may use, as two reference segmentation central points of the first sensing area generated at the first moment, sensing central points of two sensing areas generated at the reference moment (that is, a sampling moment that is closest to the first moment and at which two objects can be separated), determine an area segmentation line of the first sensing area based on the two reference segmentation central points, and segment the first sensing area based on the area segmentation line to obtain the first sensing control area and the second sensing control area. A sensing area generated when two objects (for example, fingers or sensing pens) are close together or overlap can be segmented, so that a case in which response areas of the two objects are combined or a weaker response area is covered when the two objects are close together or overlap can be effectively avoided, thereby improving control accuracy and user experience, and having high applicability.

Figure 6:
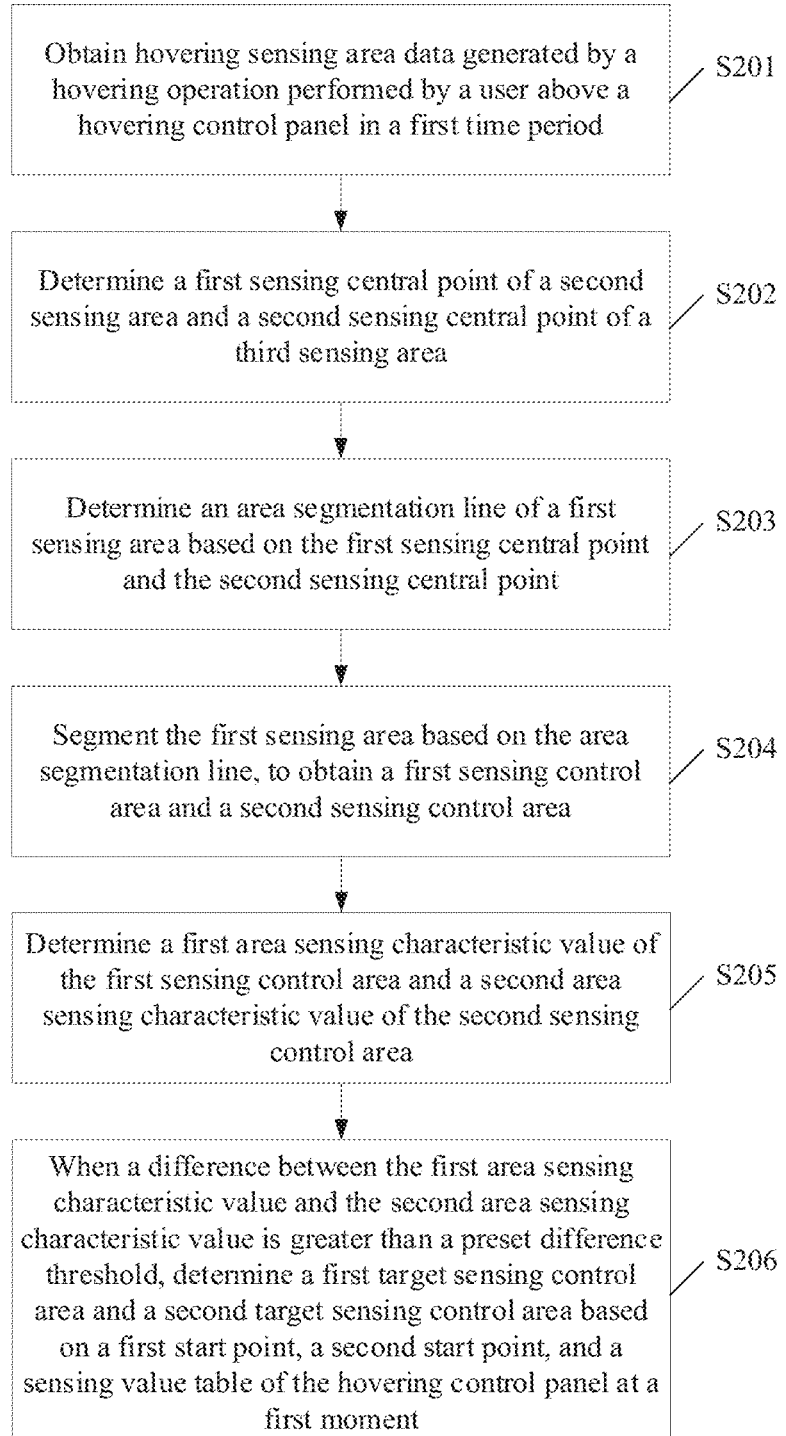
FIG. 6 is another schematic flowchart of a method for separating a sensing area according to this application.

FIG. 6 is another schematic flowchart of a method for separating a sensing area according to this application. As shown in FIG. 6, the method may include the following step S201 to step S206.

Step S201: Obtain hovering sensing area data generated by a hovering operation performed by a user above a hovering control panel in a first time period.

Step S202: Determine a first sensing central point of a second sensing area and a second sensing central point of a third sensing area.

Step S203: Determine an area segmentation line of a first sensing area based on the first sensing central point and the second sensing central point.

Step S204: Segment the first sensing area based on the area segmentation line to obtain a first sensing control area and a second sensing control area.

Herein, for descriptions of specific implementations of step S201 to step S204, refer to step S101 to step S104 in the embodiment shown in FIG. 2. Details are not described herein again.

Step S205: Determine a first area sensing characteristic value of the first sensing control area and a second area sensing characteristic value of the second sensing control area.

In some feasible implementations, a computer device determines an average value of sensing values of all points in the first sensing control area as the first area sensing characteristic value, and determines an average value of sensing values of all points in the second sensing control area as the second area sensing characteristic value.

Step S206: When a difference between the first area sensing characteristic value and the second area sensing characteristic value is greater than a preset difference threshold, determine a first target sensing control area and a second target sensing control area based on a first start point, a second start point, and a sensing value table of the hovering control panel at a first moment.

The sensing value table of the hovering control panel at the first moment includes a coordinate value and a sensing value of each point in a hovering control area.

In some feasible implementations, the computer device calculates the difference between the first area sensing characteristic value and a second sensing characteristic value, and when the difference is greater than the preset difference threshold, determines that the first sensing control area and the second sensing control area obtained in step S204 have information loss. This indicates that obtained segmentation between the first sensing control area and the second sensing control area is inaccurate. Then, the computer device determines the first target sensing control area based on the first start point and the sensing value table of the hovering control panel at the first moment, and determines the second target sensing control area based on the second start point and the sensing value table of the hovering control panel at the first moment. The first start point is a point with a maximum sensing value in the first sensing control area, and the second start point is a point with a maximum sensing value in the second sensing control area.

Then, the computer device uses the first start point as a center, and searches around based on 8-neighborhood for points that meet a first condition, and these points form the first target sensing control area; and uses the second start point as a center, and searches around based on 8-neighborhood for points that meet a second condition, and these points form the second target sensing control area. The first condition is that sensing values of points that extend outward by using the first start point as a center are on a decreasing trend, and the second condition is that sensing values of points that extend outward by using the second start point as a center are on a decreasing trend.

Specifically, the computer device determines, as a first target point, a point whose sensing value is less than a sensing value of the first start point in eight points adjacent to the first start point (that is, four points adjacent to the first start point in top, bottom, left, and right directions and four points adjacent to the first start point in diagonal directions), and adds the first start point and the first target point to a first target point set. Then, the computer device determines whether a point whose sensing value is less than a sensing value of the first target point exists in a plurality of points adjacent to the first target point, and if the point exists, determines, as the first target point, the point whose sensing value is less than the sensing value of the first target point, and adds the first target point to the first target point set. It can be understood that, all points that meet the first condition on the hovering control panel at the first moment may be obtained through the foregoing cycle; in other words, the first target point set includes the first start point and all the points that meet the first condition on the hovering control panel at the first moment. Further, the computer device forms the first target sensing control area based on a coordinate value of each point in the first target point set.

Meanwhile, the computer device determines, as a second target point, a point whose sensing value is less than a sensing value of the second start point in eight points adjacent to the second start point (that is, four points adjacent to the second start point in top, bottom, left, and right directions and four points adjacent to the second start point in diagonal directions), and adds the second start point and the second target point to a second target point set. Then, the computer device determines whether a point whose sensing value is less than a sensing value of the second target point exists in a plurality of points adjacent to the second target point, and if the point exists, determines, as the second target point, a point whose sensing value is less than a sensing value of the second target point, and adds the second target point to the second target point set. It can be understood that, all points that meet the second condition on the hovering control panel at the first moment may be obtained through the foregoing cycle; in other words, the second target point set includes the second start point and all the points that meet the second condition on the hovering control panel at the first moment. Further, the computer device forms the second target sensing control area based on a coordinate value of each point in the second target point set.

It can be understood that, the foregoing process of determining the first target sensing control area and the second target sensing control area is to perform secondary area search on an area of the hovering control panel by using a gradient descent area search method, to complete the first sensing control area and the second sensing control area to obtain a complete first target sensing control area and a complete second target sensing control area, so that segmentation accuracy of the sensing area can be further improved. It should be noted that the secondary area search method herein includes but is not limited to the gradient descent method, and another area search method is also applicable to this application.

Further, after obtaining the first target sensing control area and the second target sensing control area, the computer device may replan the first target sensing control area and the second target sensing control area, so that two finally obtained sensing areas better conform to current positions of two objects (for example, fingers).

Figure 7:
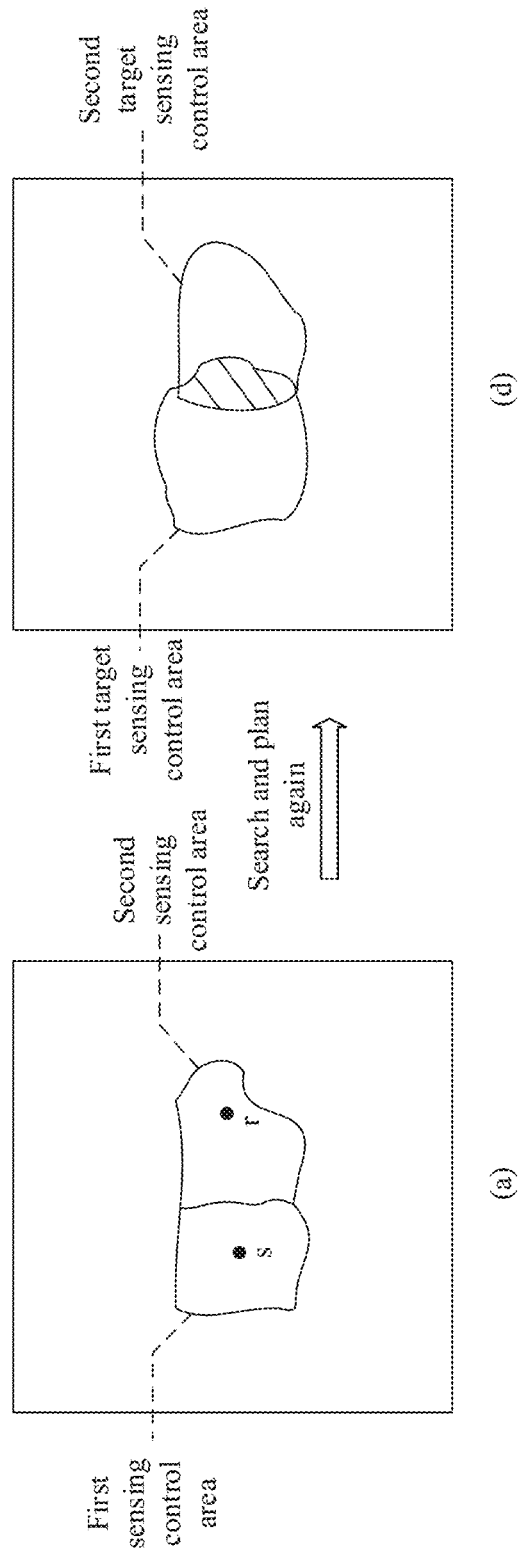
FIG. 7 is a schematic diagram of effect of a first target sensing control area and a second target sensing control area according to this application.

For example, for ease of understanding, FIG. 7 is a schematic diagram of effect of the first target sensing control area and the second target sensing control area according to this application. As shown in FIG. 7, (a) in FIG. 7 is the first sensing control area and the second sensing control area that are obtained in step S204, and the first area sensing characteristic value s of the first sensing control area and the second area sensing characteristic value r of the second sensing control area that are obtained in step S205; and (b) in FIG. 7 is the first target sensing control area and the second target sensing control area that are obtained after the computer device respectively performs area searching and planning around by using s and r as start points. An intersection area (that is, a shaded area) in the foregoing two areas is an overlapping part in sensing areas generated by the two objects.

In this embodiment of this application, the computer device may use, as a reference segmentation central point of the first sensing area generated at the first moment, sensing central points of two sensing areas generated at the reference moment (that is, a sampling moment that is closest to the first moment and at which two objects can be separated), determine an area segmentation line of the first sensing area based on the reference segmentation central point, and segment the first sensing area based on the area segmentation line to obtain the first sensing control area and the second sensing control area. Then, whether segmentation is correct may be determined by using a difference between the first area sensing characteristic value of the first sensing control area and the second area sensing characteristic value of the second sensing control area, and when the segmentation is incorrect, area searching and planning are performed around respectively by using a point with a maximum sensing value in the first sensing control area and a point with a maximum sensing value in the second sensing control area as start points, to obtain the first target sensing control area and the second target sensing control area, so that segmentation accuracy of the sensing area can be further improved, and a case in which response areas of two objects are combined or a weaker response area is covered when the two objects are close together or overlap can be effectively avoided, thereby improving control accuracy and user experience, and having high applicability.

Figure 8:
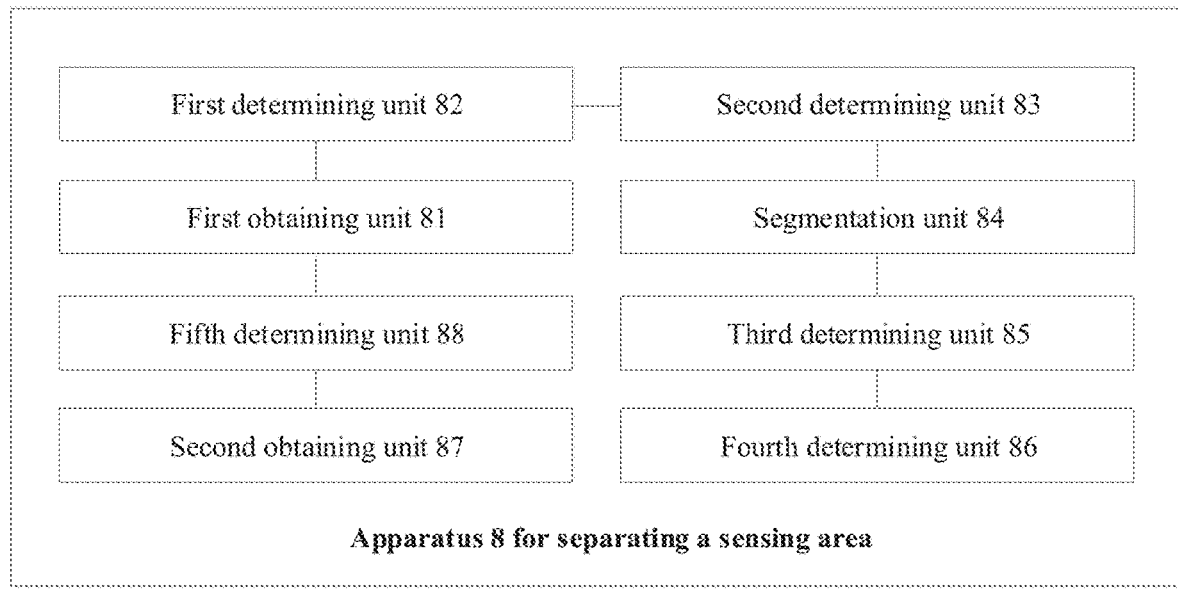
FIG. 8 is a schematic diagram of a structure of an apparatus for separating a sensing area during hovering control according to this application.

FIG. 8 is a schematic diagram of a structure of an apparatus for separating a sensing area during hovering control according to this application. The apparatus for separating a sensing area may be a computer program (including program code) running on a computer device. For example, the apparatus for separating a sensing area is application software. The apparatus for separating a sensing area may be configured to perform corresponding steps in the method provided in this application. As shown in FIG. 8, an apparatus 8 for separating a sensing area includes:

a first obtaining unit 81, configured to obtain hovering sensing area data generated by a hovering operation performed by a user above a hovering control panel in a first time period, where the hovering sensing data includes a plurality of sampling moments in the first time period and sensing data on the hovering control panel at each sampling moment, the plurality of sampling moments include a first moment and a reference moment, sensing data on the hovering control panel at the first moment includes only a first sensing area, sensing data at the reference moment includes a second sensing area and a third sensing area, and the reference moment is a sampling moment that is closest to the first moment and that is in at least one moment corresponding to the two sensing areas included in the sensing data;

a first determining unit 82, configured to determine a first sensing central point of the second sensing area and a second sensing central point of the third sensing area;

a second determining unit 83, configured to determine an area segmentation line of the first sensing area based on the first sensing central point and the second sensing central point; and a segmentation unit 84, configured to segment the first sensing area based on the area segmentation line to obtain a first sensing control area and a second sensing control area.

In some possible implementations, the first determining unit 82 is configured to respectively determine a point with a maximum sensing value in the second sensing area and a point with a maximum sensing value in the third sensing area as the first sensing central point and the second sensing central point.

In some possible implementations, the second determining unit 83 is configured to: determine, based on a connection line between the first sensing center and the second sensing center, a target area that is in the first sensing area and that is perpendicular to the connection line; and determine an area segmentation point of the first sensing area based on the target area, and obtain the area segmentation line based on the area segmentation point.

In some possible implementations, the second determining unit 83 is configured to: divide, based on a direction in which the connection line is located and a preset interval value, the target area into a plurality of row areas that are consistent with the direction in which the connection line is located; and determine a point with a minimum sensing value in each row area as the area segmentation point of the first sensing area.

In some possible implementations, the apparatus further includes:

a third determining unit 85, configured to determine a first area sensing characteristic value of the first sensing control area and a second area sensing characteristic value of the second sensing control area; and a fourth determining unit 86, configured to: when a difference between the first area sensing characteristic value and the second area sensing characteristic value is greater than a preset difference threshold, determine a first target sensing control area based on a first start point and a sensing value table of the hovering control panel at the first moment, and determine a second target sensing control area based on a second start point and the sensing value table of the hovering control panel at the first moment, where the first start point is a point with a maximum sensing value in the first sensing control area, and the second start point is a point with a maximum sensing value in the second sensing control area.

In some possible implementations, the sensing value table includes a sensing value of each point on the hovering control panel; and the fourth determining unit 86 is configured to: determine, as a first target point, a point that is in a plurality of points adjacent to the first start point and whose sensing value is less than a sensing value of the first start point, and add the first start point and the first target point to a first target point set; determine whether a point whose sensing value is less than a sensing value of the first target point exists in the plurality of points adjacent to the first target point, and if the point exists, determine the point whose sensing value is less than the sensing value of the first target point as the first target point, and add the first target point to the first target point set; and determine the first target sensing control area based on the first target point set.

In some possible implementations, the third determining unit 85 is configured to: determine an average value of sensing values of all points in the first sensing control area as the first area sensing characteristic value, and determine an average value of sensing values of all points in the second sensing control area as the second area sensing characteristic value.

In some possible implementations, the apparatus further includes:

a second obtaining unit 87, configured to obtain initial hovering control panel sensing data generated by the hovering operation performed by the user above the hovering control panel in the first time period, where the initial hovering control panel sensing data includes a plurality of sampling moments in the first time period and a sensing value table of the hovering control panel at each sampling moment, and the sensing value table includes a sensing value of each point on the hovering control panel; and a fifth determining unit 88, configured to: determine, as a target point, a point that is in the sensing value table and whose sensing value is greater than a preset sensing threshold, and determine sensing data on the hovering control panel at each sampling moment based on the target point.

In some possible implementations, the sensing value includes a capacitance value.

In specific implementation, for specific processes of implementing the steps in the foregoing possible implementations by the first obtaining unit 81, the first determining unit 82, the second determining unit 83, the segmentation unit 84, the third determining unit 85, the fourth determining unit 86, the second obtaining unit 87, and the fifth determining unit 88, refer to corresponding processes performed by the computer device in Embodiment 1. Details are not described herein again.

In this application, sensing central points of two sensing areas generated at the reference moment (that is, a sampling moment that is closest to the first moment and at which two objects can be separated) may be used as reference segmentation central points of the first sensing area generated at the first moment, the area segmentation line of the first sensing area is determined based on the reference segmentation central points, and the first sensing area is segmented based on the area segmentation line. A sensing area generated when two objects (for example, fingers or sensing pens) are close together or overlap can be segmented, so that a case in which response areas of the two objects are combined or a weaker response area is covered when the two objects are close together or overlap can be effectively avoided, thereby improving control accuracy and user experience, and having high applicability.

Figure 9:
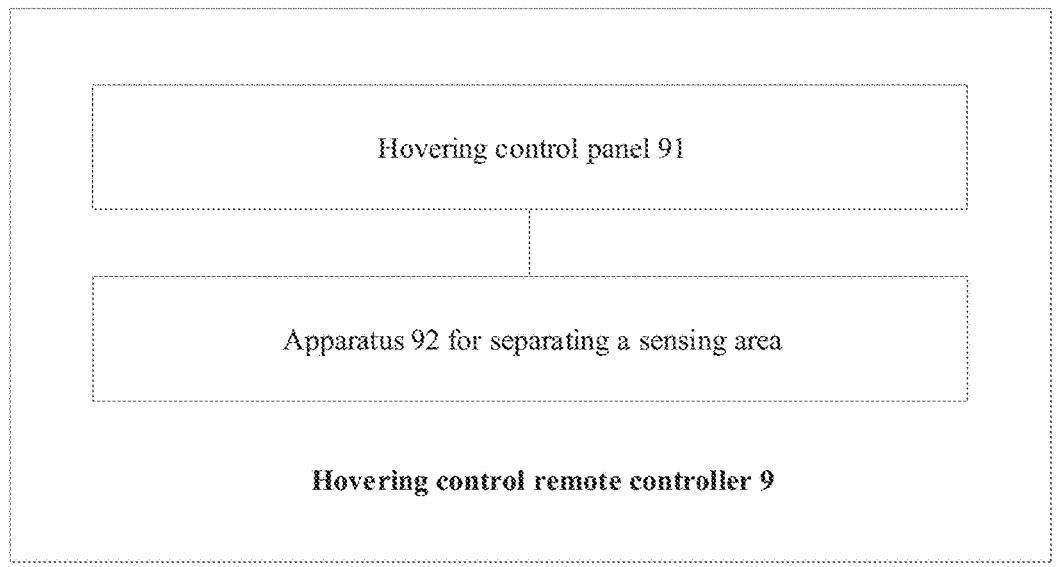
FIG. 9 is a schematic diagram of a structure of a hovering control remote controller according to this application.

FIG. 9 is a schematic diagram of a structure of a hovering control remote controller according to this application. As shown in FIG. 9, a hovering control remote controller 9 includes a hovering control panel 91 and an apparatus 92 for separating a sensing area (corresponding to the apparatus 8 for separating a sensing area in FIG. 8). The hovering control panel 91 is configured to generate initial hovering control panel sensing data (for example, a sensing value table of the hovering control panel) based on a change generated by a hardware semaphore (for example, a capacitance value) when a user performs a hovering operation above the hovering control panel 91, and sends, based on a preset frequency, initial hovering control panel sensing data at different sampling moments to the apparatus 92 for separating a sensing area. Herein, for steps performed by the apparatus 92 for separating a sensing area, refer to the descriptions of the apparatus 8 for separating a sensing area in FIG. 8. Details are not described herein again. Optionally, the hovering control remote controller 9 may further include an interaction module (not shown in the figure), configured to transmit data. Specifically, after obtaining a sensing area separation result, the apparatus 92 for separating a sensing area encapsulates the separation result based on a preset format, and sends, through the interaction module and by using a communication module (for example, a Bluetooth module), a data packet obtained through encapsulation to a display device. After receiving the data packet, the display device parses the data packet, and may obtain visual response feedback in an application.

This application further provides a computer-readable storage medium. The computer-readable storage medium stores a computer program, and when the computer program is executed by a computer, the methods or the steps performed by the computer device in the foregoing method embodiments are implemented.

This application further provides a computer program product. When the computer program product is executed by a computer device, the methods or the steps performed by the computer device in the foregoing method embodiments are implemented.

Figure 10:
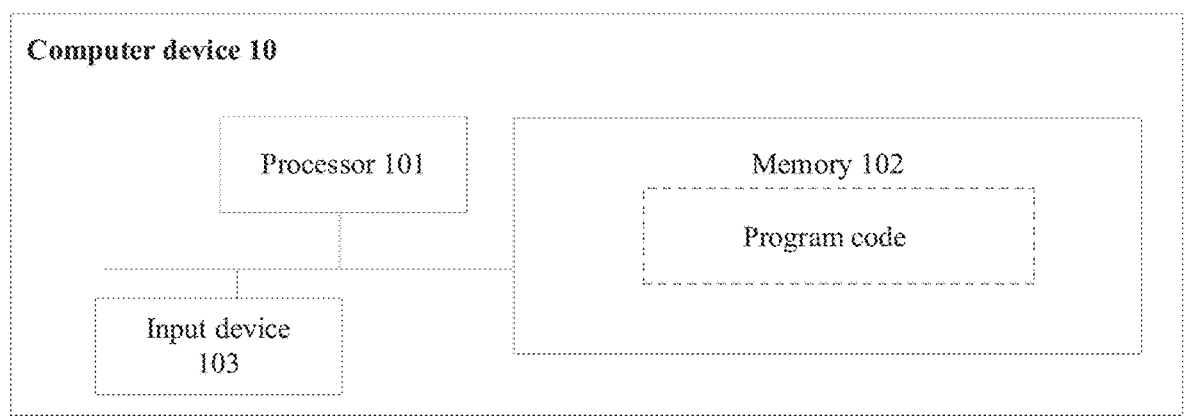
FIG. 10 is a schematic diagram of a structure of a computer device according to this application.

FIG. 10 is a schematic diagram of a structure of a computer device according to this application. As shown in FIG. 10, a computer device 10 may include at least one processor 101, at least one memory 102, and an input device 103. The processor 101, the memory 102, and the input device 103 may be connected by using a communication bus or a communication interface and communicate with each other. Herein, the processor 101, the memory 102, and the input device 103 may be configured to implement various functions of the computer device that can be implemented by the first obtaining unit 81, the first determining unit 82, the second determining unit 83, the segmentation unit 84, the third determining unit 85, the fourth determining unit 86, the second obtaining unit 87, and the fifth determining unit 88 shown in FIG. 8.

It should be understood that, the processor 101 may be a central processing unit (Central Processing Unit, CPU). The processor may alternatively be another general-purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

The input device 103 may include a device such as a hovering control panel.

The memory 102 may include a read-only memory and a random access memory, and provides instructions and data for the processor 101. The memory 102 stores the following elements: an executable module or a data structure, a subset thereof, or an extended set thereof:
  operation instructions, including various operation instructions and used to implement various operations.

Specifically, the memory 102 is configured to store program code for performing the method for separating a sensing area implemented by the computer device in the foregoing embodiments, and the processor 101 is configured to execute the program code stored in the memory 102 to implement steps of the method for separating a sensing area implemented by the computer device in the foregoing embodiments. For a specific implementation process, refer to corresponding content described in the foregoing embodiments. Details are not described herein again.

An embodiment of this application further provides a computer program product including instructions. When the computer program product runs on a computer, the computer performs the method for separating a sensing area or functions performed by the computer device in the foregoing embodiments.

An embodiment of this application further provides a computer-readable storage medium. The readable storage medium stores instructions. When a processor runs the instructions, the processor is enabled to perform the method for separating a sensing area or functions performed by the computer device in the foregoing embodiments.

In this embodiment of this application, the processor may be a general-purpose central processing unit (CPU), a microprocessor, an application-specific integrated circuit (application-specific integrated circuit, ASIC), or one or more integrated circuits for controlling program execution of the foregoing solution.

The memory may be a read-only memory (read-only memory, ROM), another type of static storage device that can store static information and instructions, a random access memory (random access memory, RAM), or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory. CD-ROM), another compact disc storage, an optical disc storage (including a compressed optical disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer, but is not limited thereto. The memory may exist independently, and is connected to the processor through the bus. Alternatively, the memory may be integrated with the processor.

All or some of the foregoing method embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber Line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state drive, SSD)), or the like.

It should be understood that, the term "and/or" in the embodiments describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in embodiments disclosed in this specification, units and algorithm steps can be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of technical solutions. A person skilled in the art may use different methods to implement the described functions for each particular application, but it should not be considered that the implementation goes beyond the scope of this application.

In conclusion, the foregoing descriptions are merely preferable embodiments of the technical solutions in this application, but are not intended to limit the protection scope of this application. Any modification, equivalent replacement, or improvement made without departing from the spirit and principle of this application shall fall within the protection scope of this application.

What is claimed is:

1. A method comprising:
    obtaining hovering sensing area data of a hovering operation of a user above a hovering control panel in a first time period, wherein the hovering sensing area data comprises sampling moments in the first time period and first sensing data on the hovering control panel at each of the sampling moments, wherein the sampling moments comprise a first moment and a reference moment, wherein second sensing data of the first sensing data at the first moment comprise a first sensing area, wherein third sensing data of the first sensing data at the reference moment comprise a second sensing area and a third sensing area, and wherein the reference moment is in one of the sampling moments closest to the first moment;
    determining a first sensing central point of the second sensing area and a second sensing central point of the third sensing area;
    determining, based on the first sensing central point and the second sensing central point, an area segmentation line of the first sensing area; and
    segmenting, based on the area segmentation line, the first sensing area to obtain a first sensing control area and a second sensing control area, wherein the first moment is in one of the sampling moments when the first sensing central point and the second sensing central points are closest together or overlap.

2. The method of claim 1, wherein determining the first sensing central point and the second sensing central point comprises:
    determining a point with a maximum sensing value in the second sensing area as the first sensing central point; and
    determining a point with a maximum sensing value in the third sensing area as the second sensing central point.

3. The method of claim 1, wherein determining the area segmentation line comprises:
    determining, based on a connection line between the first sensing central point and the second sensing central point, a target area that is in the first sensing area and that is perpendicular to the connection line;
    determining, based on the target area, an area segmentation point of the first sensing area; and
    obtaining, based on the area segmentation point, the area segmentation line.

4. The method of claim 3, wherein determining the area segmentation point comprises:
    dividing, based on a direction in which the connection line is located and a preset interval value, the target area into row areas that are consistent with the direction; and
    determining a point with a minimum sensing value in each row area as the area segmentation point.

5. The method of claim 1, further comprising:
    determining a first area sensing characteristic value of the first sensing control area and a second area sensing characteristic value of the second sensing control area; and
    when a difference between the first area sensing characteristic value and the second area sensing characteristic value is greater than a preset difference threshold:
        determining, based on a first start point and a sensing value table of the hovering control panel at the first moment, a first target sensing control area, wherein the first start point has a maximum sensing value in the first sensing control area; and
        determining, based on a second start point and the sensing value table, a second target sensing control area, wherein the second start point has a maximum sensing value in the second sensing control area.

6. The method of claim 5, wherein the sensing value table comprises a first sensing value of each point on the hovering control panel, and wherein determining the first target sensing control area comprises:
    determining, as a first target point, a first point that is in points adjacent to the first start point and that comprises a second sensing value that is less than a third sensing value of the first start point;
    adding the first start point and the first target point to a first target point set;
    determining whether a second point comprising a fourth sensing value that is less than the second sensing value exists in the points;
    when the second point exists:
        determining the second point as the first target point; and
        adding the first target point to the first target point set; and
    determining, based on the first target point set, the first target sensing control area.

7. The method of claim 5, wherein determining the first area sensing characteristic value and the second area sensing characteristic value comprises:

determining an average value of sensing values of all points in the first sensing control area as the first area sensing characteristic value; and determining an average value of sensing values of all points in the second sensing control area as the second area sensing characteristic value.

8. The method of claim 1, further comprising:

obtaining initial hovering control panel sensing data of the hovering operation of the user above the hovering control panel in the first time period, wherein the initial hovering control panel sensing data comprises the sampling moments and a sensing value table of the hovering control panel at each of the sampling moments, and wherein the sensing value table comprises a first sensing value of each point on the hovering control panel before obtaining the hovering sensing area data;

determining, as a target point, a point that is in the sensing value table and that comprises a second sensing value greater than a preset sensing threshold; and determining, based on the target point, the first sensing data.

9. The method of claim 1, wherein a sensing value of the first sensing area, the second sensing area, or the third sensing area comprises a capacitance value.

10. A computer device comprising:

a memory configured to store instructions; and one or more processors coupled to the memory and configured to execute the instructions to cause the computer device to:

obtain hovering sensing area data of a hovering operation of a user above a hovering control panel in a first time period, wherein the hovering sensing area data comprises sampling moments in the first time period and first sensing data on the hovering control panel at each of the sampling moments, wherein the sampling moments comprise a first moment and a reference moment, wherein second sensing data of the first sensing data at the first moment comprise a first sensing area, wherein third sensing data of the first sensing data at the reference moment comprise a second sensing area and a third sensing area, and wherein the reference moment is in one of the sampling moments closest to the first moment;

determine a first sensing central point of the second sensing area and a second sensing central point of the third sensing area;

determine, based on the first sensing central point and the second sensing central point, an area segmentation line of the first sensing area; and segment, based on the area segmentation line, the first sensing area to obtain a first sensing control area and a second sensing control area, wherein the first moment is in one of the sampling moments when the first sensing central point and the second sensing central points are closest together or overlap.

11. The computer device of claim 10, wherein the one or more processors are further configured to execute the instructions to cause the computer device to:

determine a point with a maximum sensing value in the second sensing area as the first sensing central point; and determine a point with a maximum sensing value in the third sensing area as the second sensing central point.

12. The computer device of claim 10, wherein the one or more processors are further configured to execute the instructions to cause the computer device to:

determine, based on a connection line between the first sensing central point and the second sensing central point, a target area that is in the first sensing area and that is perpendicular to the connection line;

determine, based on the target area, an area segmentation point of the first sensing area; and obtain, based on the area segmentation point, the area segmentation line.

13. The computer device of claim 12, wherein the one or more processors are further configured to execute the instructions to cause the computer device to:

divide, based on a direction in which the connection line is located and a preset interval value, the target area into row areas that are consistent with the direction; and determine a point with a minimum sensing value in each row area as the area segmentation point.

14. The computer device of claim 10, wherein the one or more processors are further configured to execute the instructions to cause the computer device to:

determine a first area sensing characteristic value of the first sensing control area and a second area sensing characteristic value of the second sensing control area; and when a difference between the first area sensing characteristic value and the second area sensing characteristic value is greater than a preset difference threshold:

determine, based on a first start point and a sensing value table of the hovering control panel at the first moment, a first target sensing control area, wherein the first start point has a maximum sensing value in the first sensing control area; and determine, based on a second start point and the sensing value table, a second target sensing control area, wherein the second start point has a maximum sensing value in the second sensing control area.

15. The computer device of claim 14, wherein the sensing value table comprises a first sensing value of each point on the hovering control panel, and wherein the one or more processors are further configured to execute the instructions to cause the computer device to:

determine, as a first target point, a first point that is in points adjacent to the first start point and that comprises a second sensing value that is less than a third sensing value of the first start point;

add the first start point and the first target point to a first target point set;

determine whether a second point comprising a fourth sensing value that is less than the second sensing value exists in the points;

when the second point exists:

determine the second point as the first target point; and add the first target point to the first target point set; and determine, based on the first target point set, the first target sensing control area.

16. The computer device of claim 14, wherein the one or more processors are further configured to execute the instructions to cause the computer device to:

determine an average value of sensing values of all points in the first sensing control area as the first area sensing characteristic value; and determine an average value of sensing values of all points in the second sensing control area as the second area sensing characteristic value.

17. The computer device of claim 10, wherein the one or more processors are further configured to execute the instructions to cause the computer device to:

obtain initial hovering control panel sensing data of the hovering operation of the user above the hovering control panel in the first time period, wherein the initial hovering control panel sensing data comprises the sampling moments and a sensing value table of the hovering control panel at each of the sampling moments, and wherein the sensing value table comprises a first sensing value of each point on the hovering control panel before obtaining the hovering sensing area data;

determine, as a target point, a point that is in the sensing value table and that comprises a second sensing value greater than a preset sensing threshold; and determine, based on the target point, the first sensing data.

18. The computer device of claim 10, wherein a sensing value of the first sensing area, the second sensing area, or the third sensing area comprises a capacitance value.

19. A computer program product comprising computer-executable instructions that are stored on a non-transitory computer-readable storage medium and that, when executed by one or more processors, cause a computer device to:

obtain hovering sensing area data of a hovering operation of a user above a hovering control panel in a first time period, wherein the hovering sensing area data comprises sampling moments in the first time period and first sensing data on the hovering control panel at each of the sampling moments, wherein the sampling moments comprise a first moment and a reference moment, wherein second sensing data of the first sensing data at the first moment comprise a first sensing area, wherein third sensing data of the first sensing data at the reference moment comprise a second sensing area and a third sensing area, and wherein the reference moment is in one of the sampling moments closest to the first moment;

determine a first sensing central point of the second sensing area and a second sensing central point of the third sensing area;

determine, based on the first sensing central point and the second sensing central point, an area segmentation line of the first sensing area; and segment, based on the area segmentation line, the first sensing area to obtain a first sensing control area and a second sensing control area, wherein the first moment is in one of the sampling moments when the first sensing central point and the second sensing central points are closest together or overlap.

20. The computer program product of claim 19, wherein the computer-executable instructions further cause the computer device to:

determine a point with a maximum sensing value in the second sensing area as the first sensing central point; and determine a point with a maximum sensing value in the third sensing area as the second sensing central point.

* * * * *